United States Patent
Earle

(10) Patent No.: US 9,989,663 B1
(45) Date of Patent: Jun. 5, 2018

(54) AUTO NULLING OF INDUCTION BALANCE METAL DETECTOR COILS

(71) Applicant: White's Electronics, Inc., Sweet Home, OR (US)

(72) Inventor: John L. Earle, Sweet Home, OR (US)

(73) Assignee: White's Electronics, Inc., Sweet Home, OR (US)

( * ) Notice: Subject to any disclaimer, the term of this patent is extended or adjusted under 35 U.S.C. 154(b) by 0 days. days.

(21) Appl. No.: 15/260,348

(22) Filed: Sep. 9, 2016

Related U.S. Application Data

(60) Provisional application No. 62/215,780, filed on Sep. 9, 2015.

(51) Int. Cl.
*G01V 3/10* (2006.01)
*G01V 3/38* (2006.01)

(52) U.S. Cl.
CPC .............. *G01V 3/107* (2013.01); *G01V 3/38* (2013.01)

(58) Field of Classification Search
CPC . G01V 3/107; G01V 3/38; G01V 3/15; G01V 3/081; G01V 3/08; G01V 3/104; G01V 3/10; G01V 3/165; G01V 3/12; G01V 15/00; G01V 3/088; G01V 3/17; G01V 3/02; G01V 3/26; G01V 3/28; G01V 3/00; G01V 13/00; G01V 3/06; G01V 3/101; G01V 3/083; G01V 3/102; G01V 3/105; G01V 3/16; G01V 3/04; G01V 3/082; G01V 3/108; G01V 3/30; G01V 8/10
USPC .................................................. 324/326–329
See application file for complete search history.

(56) References Cited

U.S. PATENT DOCUMENTS

| | | | | |
|---|---|---|---|---|
| 3,471,772 A * | 10/1969 | Smith | ...................... | G01V 3/15 324/329 |
| 3,823,365 A * | 7/1974 | Anderson | .............. | G01V 3/107 324/236 |
| 3,826,973 A * | 7/1974 | Pflaum | ...................... | G01V 3/15 324/233 |
| 3,882,374 A * | 5/1975 | McDaniel | .............. | G01V 3/107 324/243 |
| 3,889,179 A * | 6/1975 | Cutler | ...................... | G01V 3/06 324/326 |
| 4,628,265 A * | 12/1986 | Johnson | ................. | G01V 3/107 324/225 |
| 4,847,552 A * | 7/1989 | Howard | ................. | G01V 3/101 324/236 |

(Continued)

*Primary Examiner* — Jay Patidar
(74) *Attorney, Agent, or Firm* — James Creighton Wray; Meera P. Narasimhan

(57) ABSTRACT

A metal detector has a large primary transmit coil, a small primary feedback bucking coil, a first receive coil, and a second receive coil. A variable resistance device is connected to the first and second receive coils. A voltage source is connected to the large primary transmit coil. The voltage source is oppositely connected to the small primary feedback bucking coil. A primary voltage is provided to the large primary transmit coil. A reverse primary voltage is provided to the small primary feedback bucking coil. The small primary feedback bucking coil is positioned near the first and the second receive coils. The metal detection methods and apparatus sums up the signals from the two secondary coils. One is over nulled, the other is under nulled. They are close enough to an inductive null to attenuate the stray coupled signals from the primary driving signal and detecting the object.

17 Claims, 8 Drawing Sheets

(56) References Cited

U.S. PATENT DOCUMENTS

| | | | | |
|---|---|---|---|---|
| 5,537,041 | A * | 7/1996 | Candy .................... | G01V 3/105 |
| | | | | 324/233 |
| 9,638,825 | B2 * | 5/2017 | Hahl ....................... | G01V 3/107 |
| 2003/0067293 | A1 * | 4/2003 | Golder ................... | G01V 3/107 |
| | | | | 324/67 |
| 2007/0046288 | A1 * | 3/2007 | Westersten ............. | G01V 3/105 |
| | | | | 324/326 |
| 2011/0316541 | A1 * | 12/2011 | Earle ..................... | G01V 3/104 |
| | | | | 324/326 |

* cited by examiner

TYPICAL 3 COIL CONCENTRIC SYSTEM

CONCENTRIC WITH 2 RECEIVE COILS

AUTO NULLING OF INDUCTION BALANCE METAL DETECTOR COILS

BACKGROUND OF THE INVENTION

The induction balanced metal detector search coil is typically an air core transformer with an outer large primary coil for inducing a magnetic field in the ground to be investigated and a smaller secondary coil producing an output signal that is altered by eddy current objects, such as coins, within the field area.

However, the secondary signal may be several volts from the induced current from the primary, which masks the usual tiny millivolt signal change due to the coin being sought. Usually, various methods are employed to reduce the induced secondary signal to nil by achieving an "induction balance". One method is to have a third coil or second primary that is tightly coupled to the secondary coil, but of opposite phase to the main primary such that the net voltage in the secondary is nil, until the field is disturbed by the coin or other eddy current object. Typically, this three-coil arrangement is arranged as three concentric coils. A near perfect null is achieved by physically adjusting the last turn of the second primary and then anchoring it in place.

Another method of achieving the induction balance and getting a good null is by having one primary and a slightly overlapping secondary that is critically located where the null is a minimum.

Both methods suffer from increases in the null voltage due to minor mechanical shifts in the coil positions, both in manufacturing and due to aging.

Previous methods of achieving an electronic null have utilized feedback from the large primary driving signal through a variable gain device, such as an OTA (operational transconductance amplifier) to the secondary coil signal. But this method introduces noise because the canceling voltage is not from the inductive coupling of the air core transformer.

Needs exist for improved induction balance and improved nulling of the primary coil signal received by the secondary coil.

SUMMARY OF THE INVENTION

The invention provides improved nulling of a signal received from a primary coil by a secondary coil in a metal detector.

The invention provides an electronic method of summing the signals from two secondary coils. One is over nulled, and the other is under nulled. While neither is perfectly nulled, they are close enough to an inductive null to attenuate the stray coupled signals from the primary driving signal.

A metal detector has a large primary transmit coil, a small primary feedback bucking coil, a first receive coil, and a second receive coil. A variable resistance device is connected to the first receive coil and to the second receive coil. A voltage source is connected to the large primary transmit coil. The voltage source is oppositely connected to the small primary feedback bucking coil. A primary voltage is provided to the large primary transmit coil. A reverse primary voltage is provided to the small primary feedback bucking coil. The small primary feedback bucking coil is positioned near the first receive coil and the second receive coil. In one form, the primary transmit coil, the primary feedback bucking coil, the first receive coil and the second receive coil are concentric and coplanar.

In one embodiment, the primary transmit coil is wound in a first direction, and the primary feedback bucking coil is wound in a second direction opposite to the first direction. The first receive coil is wound in a first direction, and the second receive coil is wound in a second direction opposite to the first direction.

The variable resistance device is connected between the first receive coil and the second receive coil and a nulled signal output is connected to the variable resistance device. The primary feedback bucking coil is relatively closer to the first receive coil and relatively farther from the second receive coil. The primary feedback bucking coil produces a relatively greater effect upon the first receive coil and a lesser effect upon the second receive coil.

The primary transmit coil, the primary feedback bucking coil, the first receive coil and the second receive coil are coplanar. The primary transmit coil is outside the primary feedback bucking coil. The primary feedback bucking coil is inside the primary transmit coil. The first receive coil is outside the primary feedback bucking coil, and the second receive coil is outside the first receive coil.

In some embodiments, the variable resistance device is a potentiometer. The potentiometer is a digital potentiometer. A microprocessor controls the digital potentiometer. A control and memory is connected between the microprocessor and the digital potentiometer.

An up/down input, an increment input, a select input, a supply voltage input and a ground source input are connected to the control and memory.

Photocells control the variable resistance device.

A first end of the first receive coil is connected to a first end of the variable resistance device. A second end of the first receive coil is connected to a first end of the second receive coil. An inverting amplifier is connected to a second end of the second receive coil. The inverting amplifier is connected to a second end of the variable resistance device. A nulled signal output is connected to the variable resistance device.

The new method detects metal objects by using a large primary coil and a smaller primary feedback bucking coil, a first receive coil and a second receive coil and a variable resistance device, A primary voltage is provided to the larger primary coil. A reverse primary voltage is provided to the smaller primary feedback bucking coil. A secondary voltage from detected objects is received in the first receive coil, and secondary voltage from the detected objects is received in the second receive coil. The received voltage signals from the first receive coil and the second receive coil are summed.

The summing is adjusted with the variable resistance device, nulling differences between the received secondary voltage from the first receive coil and from the second receive coil that has been caused by the primary and reverse primary voltage.

These and further and other objects and features of the invention are apparent in the disclosure, which includes the above and ongoing written specification, with the claims and the drawings.

DETAILED DESCRIPTION

Figure 1:
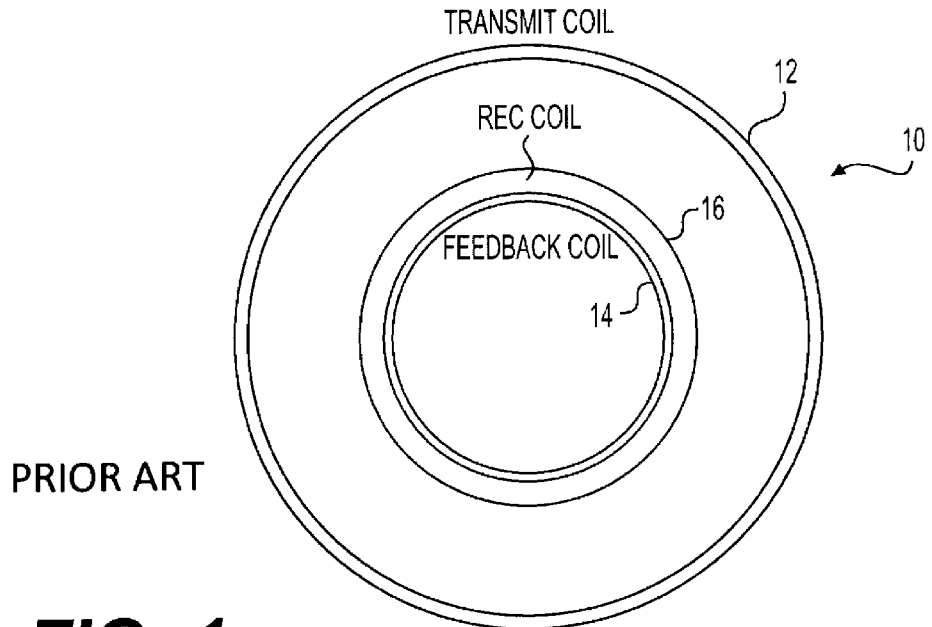
FIG. 1 shows a metal detector typical three-coil concentric system.

FIG. 1 illustrates the concentric coil arrangement in the typical 3 coil system 10. The main outer primary coil 12 induces a magnetic field in the ground. An inner bucking or primary feedback coil 14 is adjacent secondary receiving coil 16.

Figure 2:
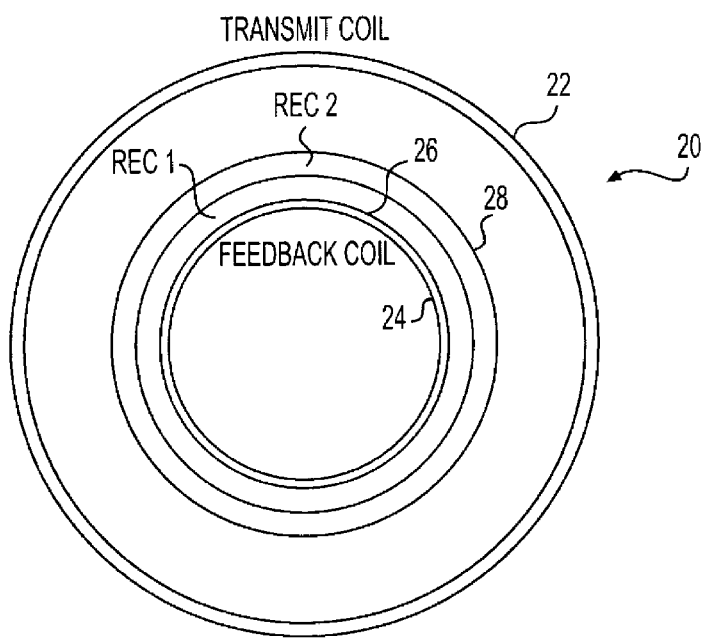
FIG. 2 shows a metal detector concentric coil system with two receive coils in a metal detector.

FIG. 2 illustrates the concentric coil arrangement 20 of the invention with an outer primary coil 22, an, inner bucking or feedback coil 24 and two adjacent secondary receiving coils, receive 1, 26 and receive 2, 28.

In this new coplanar concentric coil system 20, the inductive coupling coefficient between coils is approximately equal to the cube of the diameters. Thus, the first inner receive secondary coil 26 is closest to the inner primary feedback coil 24, producing an over nulled signal. The second receive coil 2, secondary coil 28, which is on top or outside of the first inner receive secondary coil 26, is further away from the feedback primary coil 24. Therefore, the second receive coil 28 is undernulled.

The overnulled and undernulled signals in receive coil 1 and receive coil 2, coils 26 and 28, are of opposite polarity, so the actual null is achieved by a potentiometer type device between the two secondary receiving coils.

Figure 3:
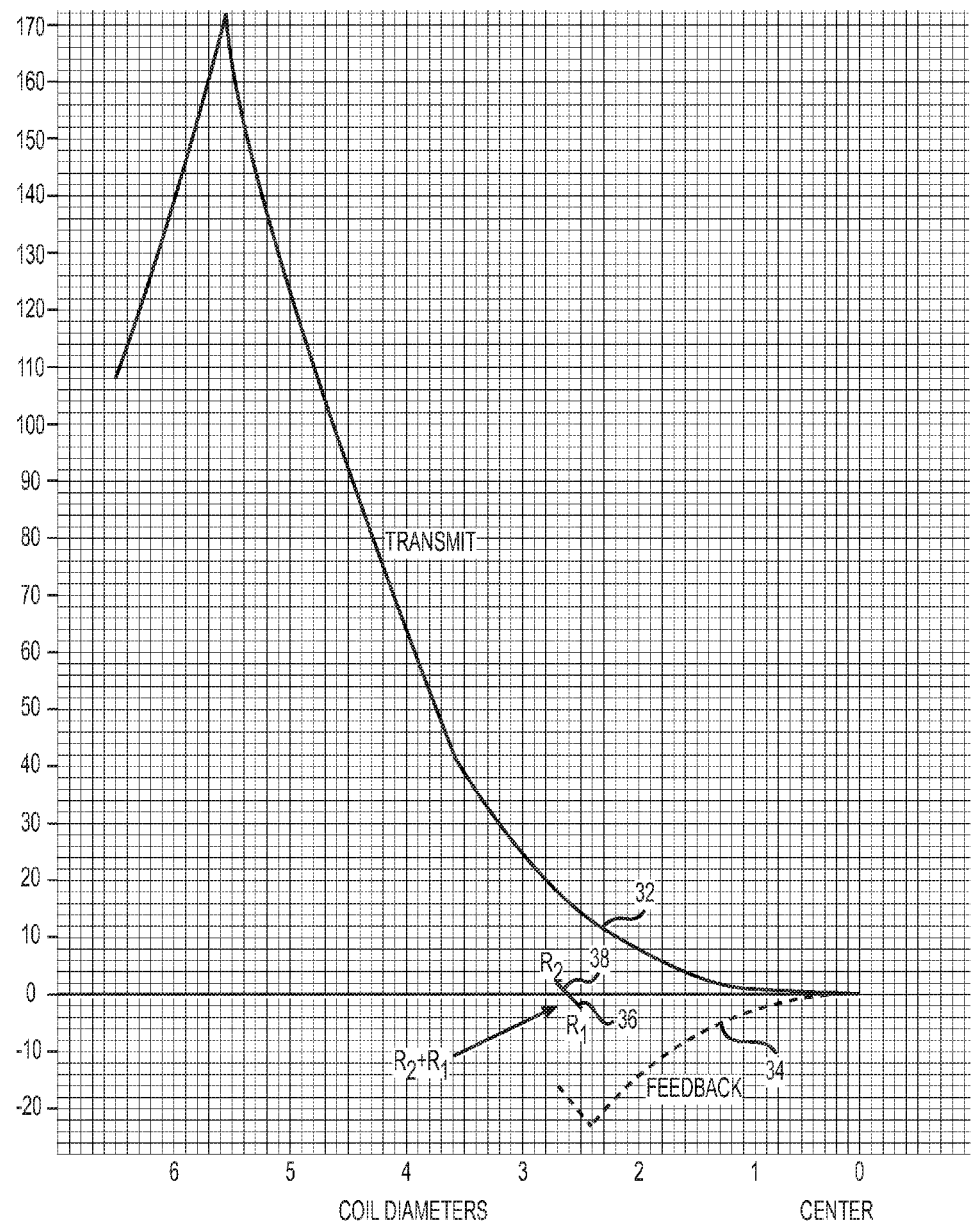
FIG. 3 is a graph showing relative field strengths of main and feedback primary coils and the secondary nulls with opposite polarities.

FIG. 3 illustrates the relative field strengths of the main 32 and feedback 34 primaries and the secondary nulls 36 and 38 in the receive coils $R_1$ and $R_2$ showing their opposite polarity, so that the signal in $R_1$ and $R_2$ from the two primary coils equals zero.

Implementation can be accomplished in several ways where a variable resistance device is employed. Variable resistance devices that may be used include a mechanical or digital potentiometer. A digital potentiometer may be driven by a microprocessor and by photoconductive devices whose resistance is controlled by current flowing through an LED that illuminates the photoconductive element.

Besides making the mechanical nulling operation easier, or even nonexistent, the change in null due to the iron mineralization in the ground being searched can also be compensated out as well as long term mechanical location drift of the coils.

Heretofore, when severe ground iron mineralization was encountered, the null voltage would typically increase to the point of overloading the signal amplifier, forcing the operator to reduce the overall amplifier gain to keep from overloading the amplifier.

Figure 4:
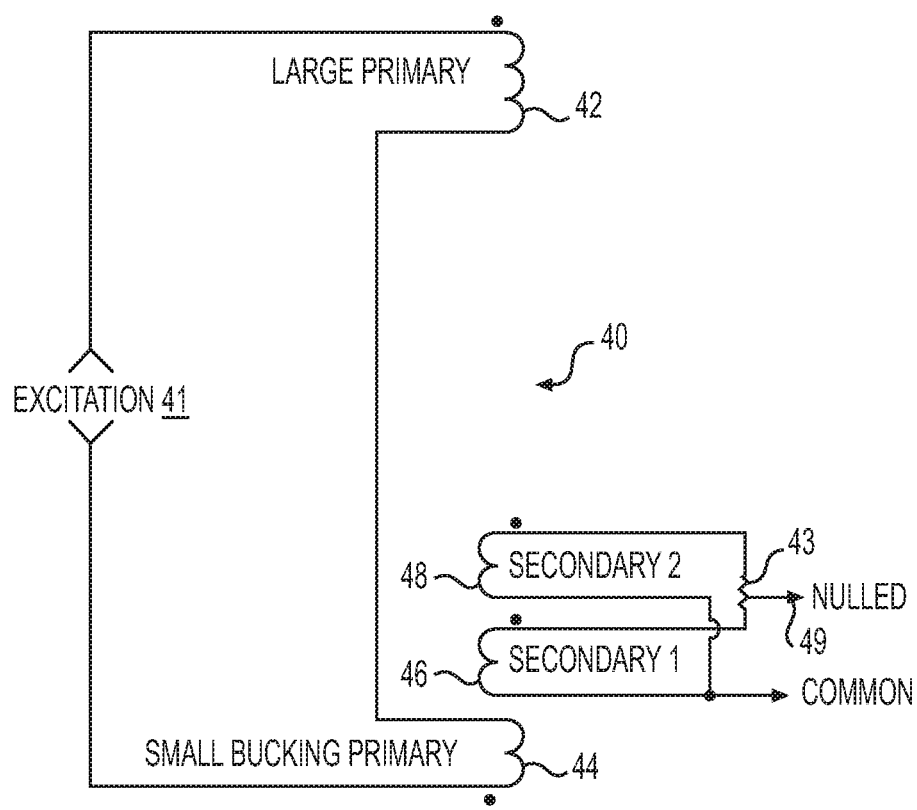
FIG. 4 is a schematic representation of potentiometric nulling.

FIG. 4 is a schematic representation of a potentiometric nulling 40. An excitation voltage 41 is applied to a large primary coil 42 and a small bucking primary coil 44. Secondary receive coil 1, coil 46, is positioned near the small bucking primary coil 44. Secondary receive 1 coil 48 is positioned further from the bucking primary coil 44. Potentiometer 43 adjusts the null 49. As a result of the potentiometer adjustment, the outputs of both receive coils 1 and 2 are devoid of signals from the primary transmit coil.

Figure 5:
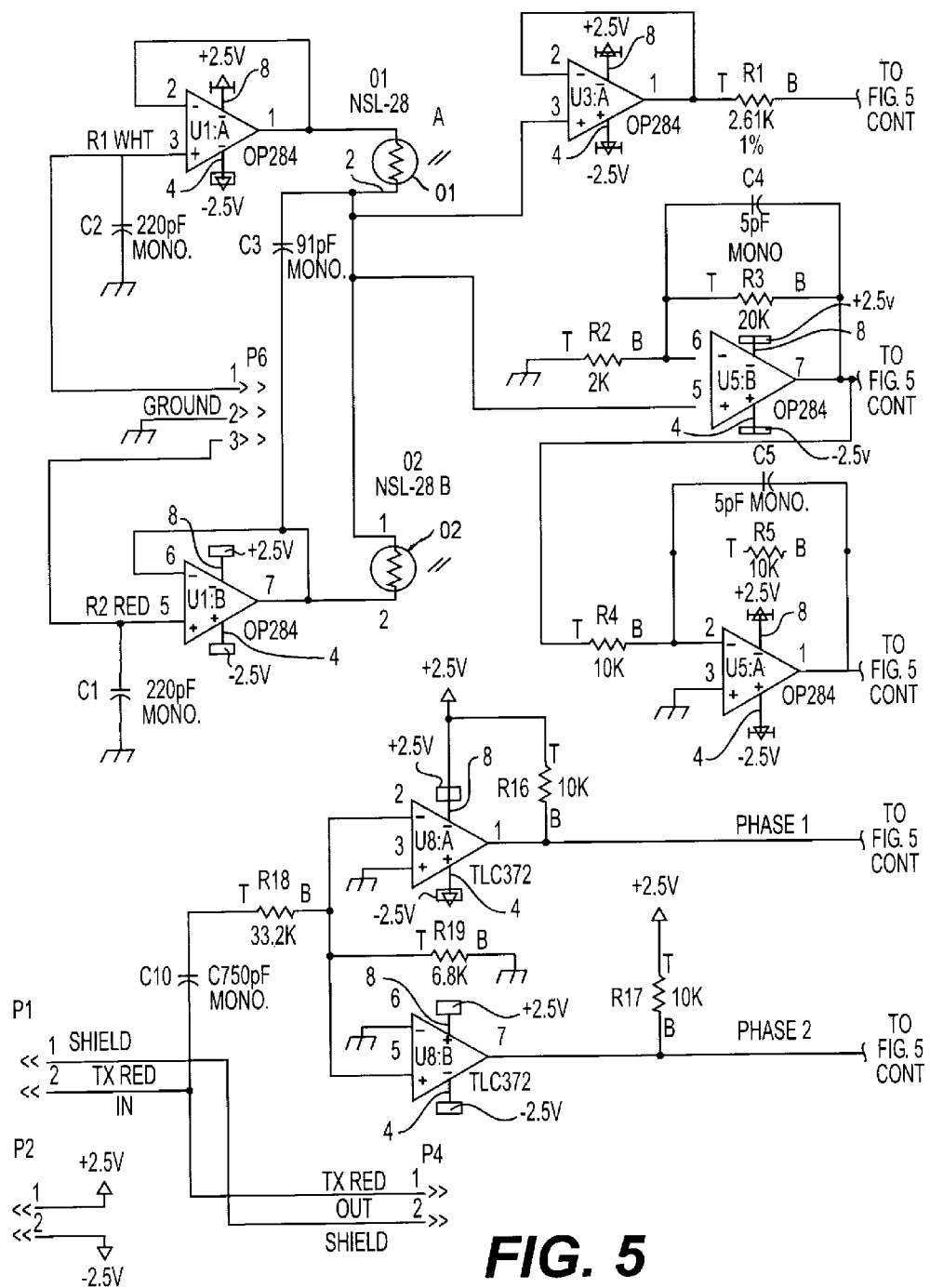
FIG. 5 is a schematic representation of an electronic nulling circuit.

FIG. 5 is a schematic representation of an analog electronic nulling schematic 50.

The electronic compensating schemes utilize feedback to drive the adjustment to the desired null. Dynamic adjustment can be controlled at a rate that is most desirable for ground mineralization elimination and is consistent with target detection.

As shown in FIG. 5, the two secondary receive coils coming from P6 are buffered for a low impedance to drive the quasi potentiometer made up of photo resistive elements O1 and O2. The junction of these devices (equivalent to the potentiometer wiper) is buffered by U3A driving the metal detector circuitry through P5. This same junction of O1 and O2 resistive elements drives amplifier U5:A and U5:B to full wave synchronous demodulators U6:A and U6:B. Said synchronous demodulators are controlled by comparators U8:A and U8:B, establishing them in phase with the inductive nulling point of the two secondary receive coils.

Synchronously detected direct current voltage from U6:A and U6:B is filtered by C7 and selected for a fast time constant, slow time constant or essentially infinite hold DC voltage applied to high impedance amplifier buffer U7:A driving amplifier U3:B which controls the LED (light emitting diodes) that irradiate the optically controlled photo resistive devices in O1 and O2.

Network R12, R13, D1, D2, R20 and R21 help to compensate for the non-linearity of the voltage to resistance characteristic of the photo resistive devices, O1 and O2.

Error amplifier U5:B is referenced to ground, driving the entire feedback system to adjust the photo resistive devices to maintain the nearly nulled inductive generated signal from the two receive coil secondaries with the greatest correction for the inductive null error and the least amount of correction for eddy current targets displaced in phase from the inductive signal.

Both receive coils wind in the same direction. The winding in the same direction puts inside coil ground S1 of coil $R_1$ away from outside coil $R_2$ hot side F2 and puts outside coil ground S2 close to hot side F1 of inside coil $R_1$.

Figure 6:
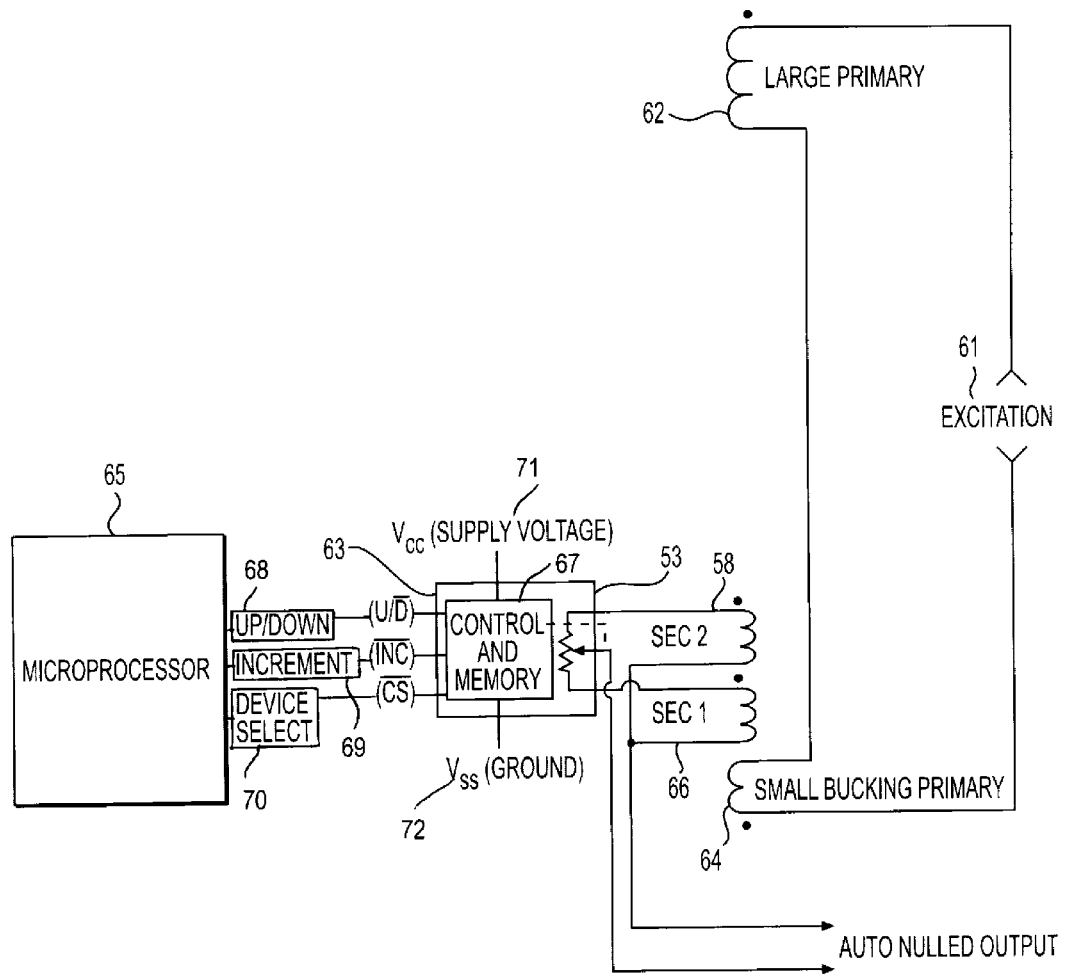
FIG. 6 is a block diagram of a circuit using a digital potentiometer controlled by a microprocessor.

As shown in FIG. 6 an auto nulling system 63 adjusts the air core sensing transformer of a metal detector to correct for physical misalignment of the air core transformer coils 62, 64, errors caused by the core effect of the ground upon the air core coupling ratio, the large primary coil 62, the inexact number of turns in the nulling scheme small bucking coil 64 and other factors allowing for maximum amplification of the desired eddy current target without overloading the metal detection analysis circuitry.

The new system uses resistive potentiometric devices ratioing 53 between two secondary coils 58, 66, one over nulled and one under nulled.

The new system uses negative feedback through a photo resistive controlling element, a potentiometer to establish the desired null, or a digital potentiometer driven by a microprocessor 65 from null, ground and other pertinent signal data. A control and memory 67 is connected between the microprocessor 65 and the digital potentiometer. An up/down input 68, an increment input 69, a select input device 70, a supply voltage input 71 and a ground source input 72 are connected to the control and memory 67.

Figure 7:
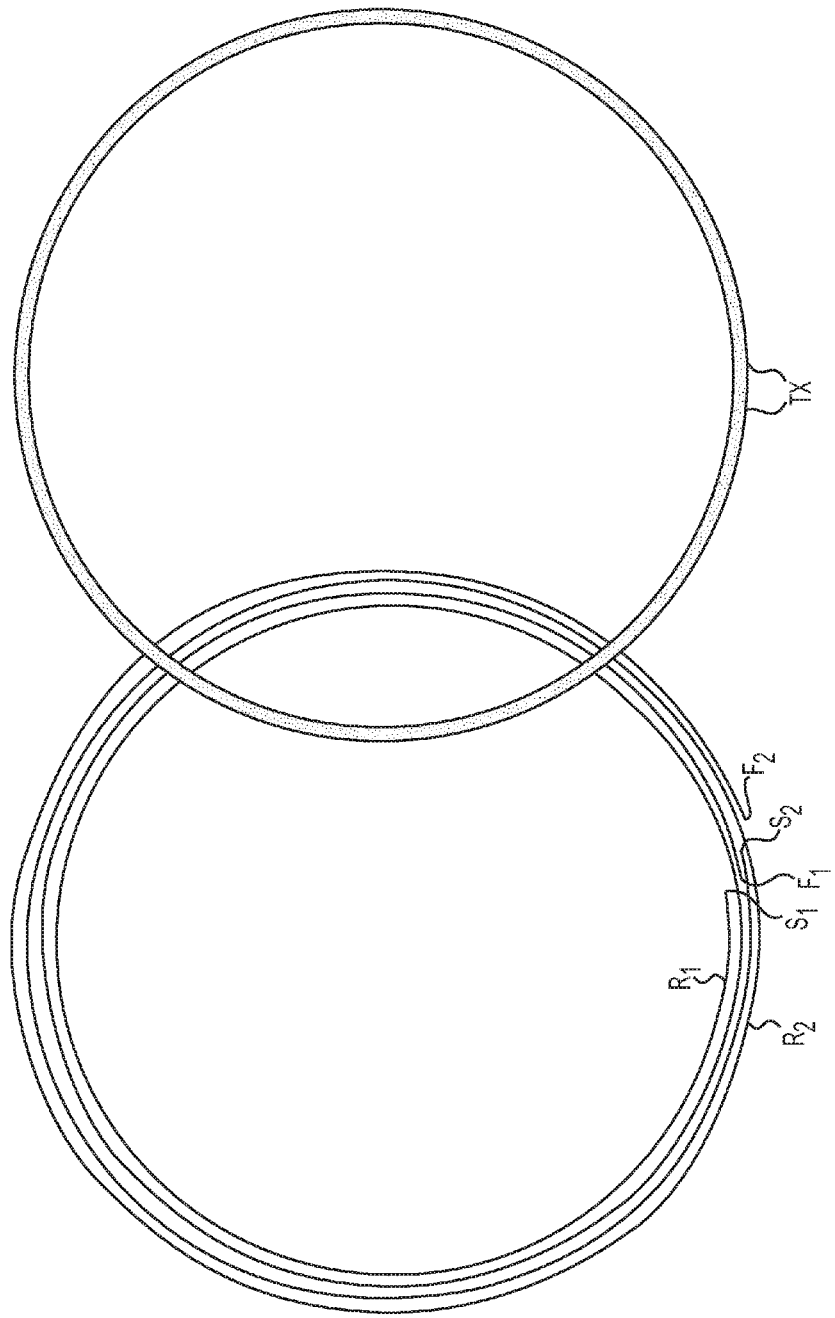
FIG. 7 shows practical considerations of two receive coil windings.

As practical consideration dealing with the capacitance between the two receive coil windings, for convenience in manufacturing, multiple coils are wound in the same direction as shown in FIG. 7. Secondary receive coil $R_1$ is wound clockwise from start S1 to finish F1. Secondary receive coil $R_2$ is wound clockwise from start S2 to finish F2.

FIG. 7 shows practical considerations of two receive coil windings.

Figure 8:
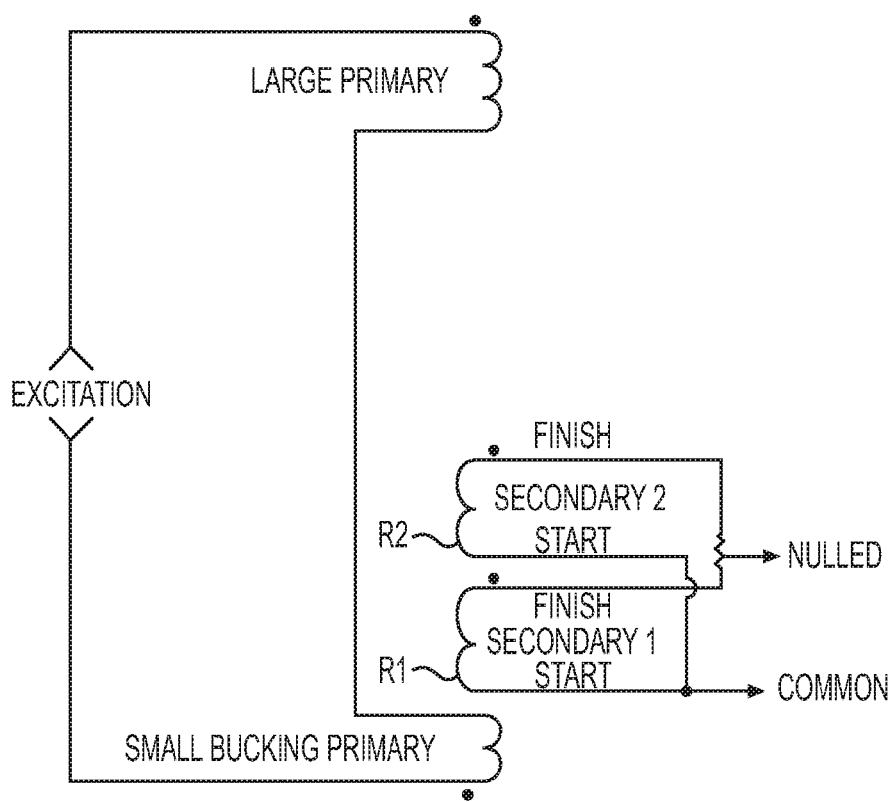
FIG. 8 shows possible connections of two receive coils.

As FIG. 8 depicts, the coils are shown using the dotted ends as the signal. The dotted ends are the finish of each coil.

At higher frequencies of operation, the internal receive coil $R_1$ capacitance alters the phase. As shown in FIG. 8, the finish of the first coil $R_1$ is adjacent to the start of the second coil $R_2$. So, in addition to the self capacitance between windings of each coil, coil $R_2$ has its start directly on top of and mingled with the finish of coil $R_1$, adding additional capacity to the coil $R_1$ signal, which is undesirable.

One solution is winding the two coils in opposite directions, but this is not practical.

Figure 9:
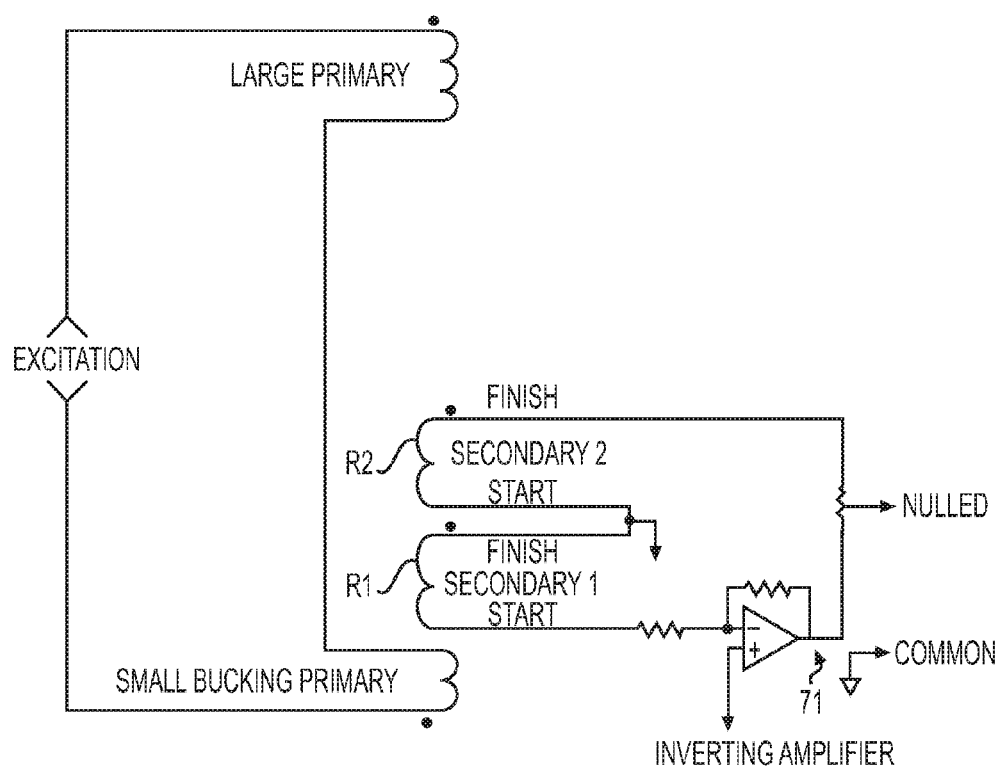
FIG. 9 shows a connection using an inverting amplifier to maintain similar and opposite capacitive loading of both receive coils.

A second solution as shown in FIG. 9 is to make the finish of coil $R_1$ and start of coil $R_2$ the ground end of both coils, leaving the other ends away from the other coil, giving similar capacitance for both. With the two receive coils $R_1$ and $R_2$, one would on top of the other, it is beneficial to have the two coils adjacent to each other at ground potential and take the signals from the inside of the first coil and the outside of the second coil. That inverts their relationship. So the circuitry would then look at the difference between the two to get the null.

This has the advantage of minimum coil capacity from both coils and, since it is a differential, the noise from external sources is essentially cancelled out.

However, that second solution changes the phase of the coil $R_1$ output. Adding an inverting amplifier 71 to coil $R_1$, as shown in FIG. 9, solves that problem. The phases presented to the variable adjusting potentiometer are opposite again, as they should be, since one coil is overnulled with one phase and the other undernulled with resultant again out of phase across the potentiometer, enabling the null to be obtained with similar capacitive loading of both coils.

In addition, there is another advantage to this configuration because the nulling is now looking at the coils differentially. Noise that appears on the finish ends of both coils will be similar in phase and amplitude allowing the differential amplifier to reject that kind of noise.

The invention as shown in FIG. 9 reduces noise and maintains similar capacitive loading of both receive coils with this configuration, and does not require the two coils to be wound in opposite directions.

While the invention has been described with reference to specific embodiments, modifications and variations of the invention may be constructed without departing from the scope of the invention, which is defined in the following claims.

I claim:

1. Apparatus comprising:
   a metal detector having
   a large primary transmit coil,
   a small primary feedback bucking coil,
   a first receive coil,
   a second receive coil, and
   a variable resistance device,
   wherein the first receive coil and second receive coil are wound in a uniform direction,
   wherein a first end of the first receive coil is connected to a first end of an inverting amplifier, a second end of the first receive coil is connected to a first end of the second receive coil, a second end of the second receive coil is connected to a first end of the variable resistance device, the inverting amplifier is connected to a second end of the variable resistance device, and a nulled signal output is connected to the variable resistance device.

2. The apparatus of claim 1, further comprising a voltage source connected to the large primary transmit coil and oppositely connected to the small primary feedback bucking coil for providing a primary voltage to the large primary transmit coil and for providing a reverse primary voltage to the small primary feedback bucking coil, and wherein the small primary feedback bucking coil is positioned near the first receive coil and the second receive coil.

3. The apparatus of claim 2, wherein the primary transmit coil, the primary feedback bucking coil, the first receive coil and the second receive coil are concentric and coplanar.

4. The apparatus of claim 1, wherein the primary transmit coil is wound in a first direction, and the primary feedback bucking coil is wound in a second direction opposite to the first direction.

5. The apparatus of claim 1, wherein the primary feedback bucking coil is relatively closer to the first receive coil and relatively farther from the second receive coil.

6. The apparatus of claim 1, wherein the primary feedback bucking coil produces a relatively greater effect upon the first receive coil and a lesser effect upon the second receive coil.

7. The apparatus of claim 1, wherein the primary transmit coil, the primary feedback bucking coil, the first receive coil and the second receive coil are coplanar.

8. The apparatus of claim 1, wherein the primary transmit coil is outside the primary feedback bucking coil, the primary feedback bucking coil is inside the primary transmit coil, the first receive coil is outside the primary feedback bucking coil, and the second receive coil is outside the first receive coil.

9. The apparatus of claim 1, wherein the variable resistance device is a potentiometer.

10. The apparatus of claim 9, wherein the potentiometer is a digital potentiometer.

11. The apparatus of claim 10, further comprising a microprocessor controlling the digital potentiometer.

12. The apparatus of claim 11, further comprising a control and memory connected between the microprocessor and the digital potentiometer.

13. The apparatus of claim 12, further comprising each of an up/down input, an increment input, a select input, a supply voltage input and a ground source input connected to the control and memory.

14. The apparatus of claim 13, further comprising photocells controlling the variable resistance device.

15. A method comprising:
   detecting metal by:
   providing a large primary coil and a smaller primary feedback bucking coil,
   providing a first receive coil and a second receive coil,
   providing a variable resistance device,
   wherein the first receive coil and second receive coil are wound in a uniform direction,
   wherein a first end of the first receive coil is connected to a first end of an inverting amplifier, a second end of the first receive coil is connected to a first end of the second receive coil, a second end of the second receive coil is connected to a first end of the variable resistance device, the inverting amplifier is connected to a second end of the variable resistance device, and a nulled signal output is connected to the variable resistance device,
   providing a primary voltage to the larger primary coil, providing a reverse primary voltage to the smaller primary feedback bucking coil, stopping the providing of the primary voltage and the reverse primary voltage, sensing a secondary voltage from detected objects in the first receive coil, and sensing the secondary voltage from the detected objects in the second receive coil.

16. The method of claim 15, further comprising summing the received voltage signals from the first receive coil and the second receive coil.

17. The method of claim 16, further comprising adjusting the summing with the variable resistance device by removing differences between the received secondary voltage from the first receive coil and from the second receive coil.

\* \* \* \* \*